United States Patent [19]

Russell et al.

[11] Patent Number: 5,038,437
[45] Date of Patent: Aug. 13, 1991

[54] FOLDING SEAT HINGE ASSEMBLY

[75] Inventors: Ronald W. Russell, Utica; Larry R. Cox, Brownstown; Siavash J. Jowkar, Northville, all of Mich.

[73] Assignee: Chrysler Corporation, Highland Park, Mich.

[21] Appl. No.: 603,339

[22] Filed: Oct. 26, 1990

[51] Int. Cl.$^5$ .............................................. E05D 7/10
[52] U.S. Cl. ........................................ 16/266; 16/260; 16/267; 16/341; 16/388; 296/65.1; 297/379
[58] Field of Search ................ 16/260, 262, 266, 267, 16/341, 356, 388; 296/65.1; 297/379

[56] References Cited

U.S. PATENT DOCUMENTS

| 2,302,661 | 11/1942 | Benson | 16/267 |
| 3,807,790 | 4/1974 | Erard | 297/379 X |
| 4,475,769 | 10/1984 | Crawford et al. | 297/379 X |
| 4,512,609 | 4/1985 | Parsson | 297/331 |
| 4,888,854 | 12/1989 | Russell et al. | 16/266 |

FOREIGN PATENT DOCUMENTS

| 123015 | 12/1946 | Australia | 16/388 |
| 2628726 | 1/1978 | Fed. Rep. of Germany | 16/266 |
| 1469438 | 4/1977 | United Kingdom | 16/266 |
| 1574717 | 9/1980 | United Kingdom | 16/356 |

Primary Examiner—E. Michael Combs
Attorney, Agent, or Firm—Edward P. Barthel

[57] ABSTRACT

A pair of separable hinge assemblies mount a seat cushion on a vehicle for positioning between a rearwardly folded regular seating mode and a forwardly folded stored mode. The hinge assemblies each comprise a body-half hinge plate mounted to the vehicle body and a seat-half hinge plate mounted to the seat cushion hardened undersurface. The body-half plate has upstanding side webs each formed with open end mirror image slots adapted to releasably capture a pintle pin extending transversely between parallel ear portions of the seat-half hinge plate. Each ear portion includes mirror image first and second cam shoulders adapted to frictionally retain the hinge assemblies in their respective seating or folded modes. Upon placement of the seat cusion in an intermediate position both sets of cam shoulders of each seat-half hinge plate are spaced from their associated body-half plate camming surfaces. An improved fail-safe arrangement provides arcuate-shaped guide prongs on the seat-half hinge plate adapted for reception in aligned apertures in the body-half hinge plate with the plates in positive full engagement. If, however, the hinge plates are not properly engaged the seat-half hinge plate guide prongs are moved into rocking contact with the body-half hinge plate preventing the seat cushion from being folded to its regular seating position.

3 Claims, 3 Drawing Sheets

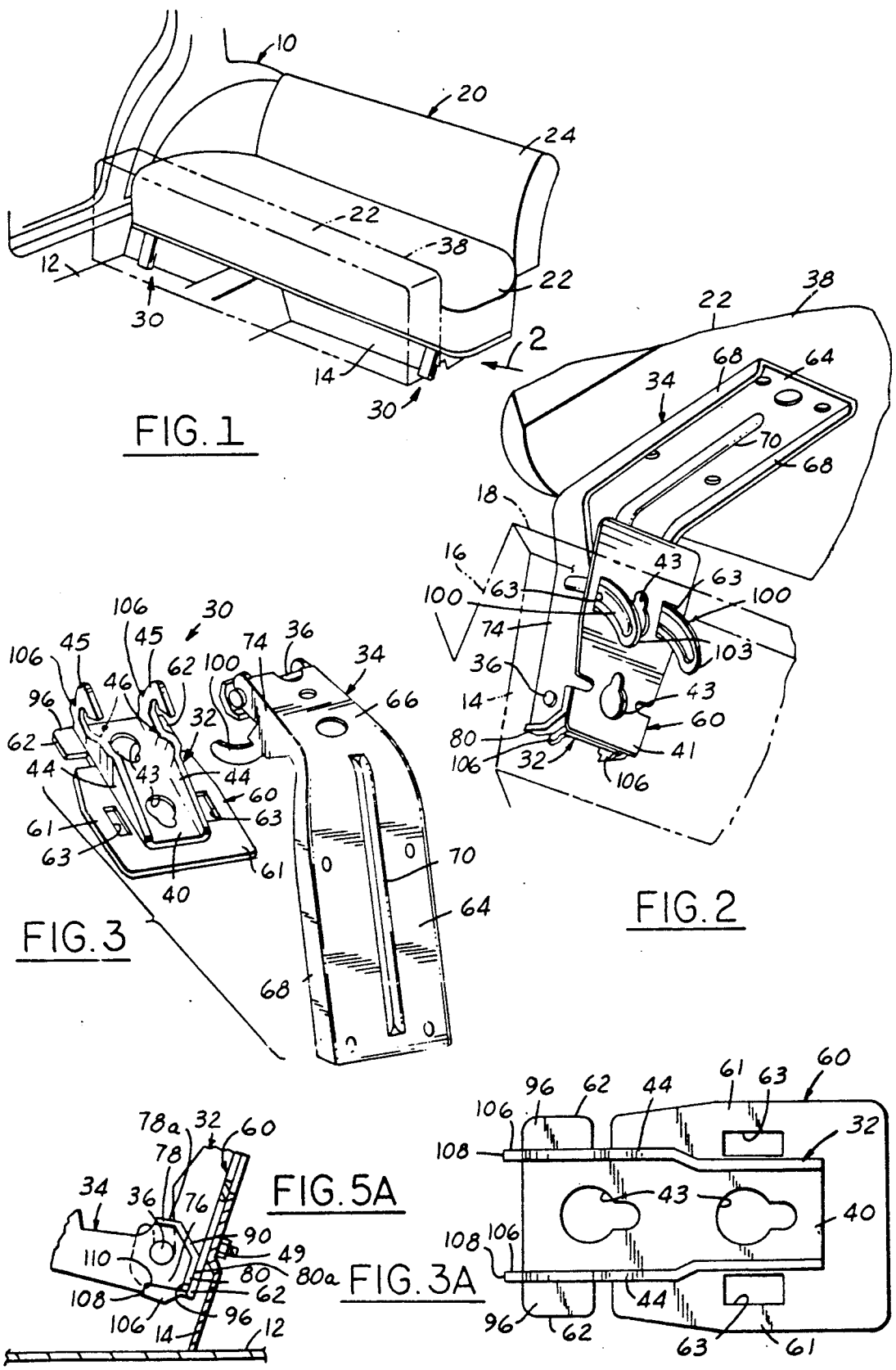

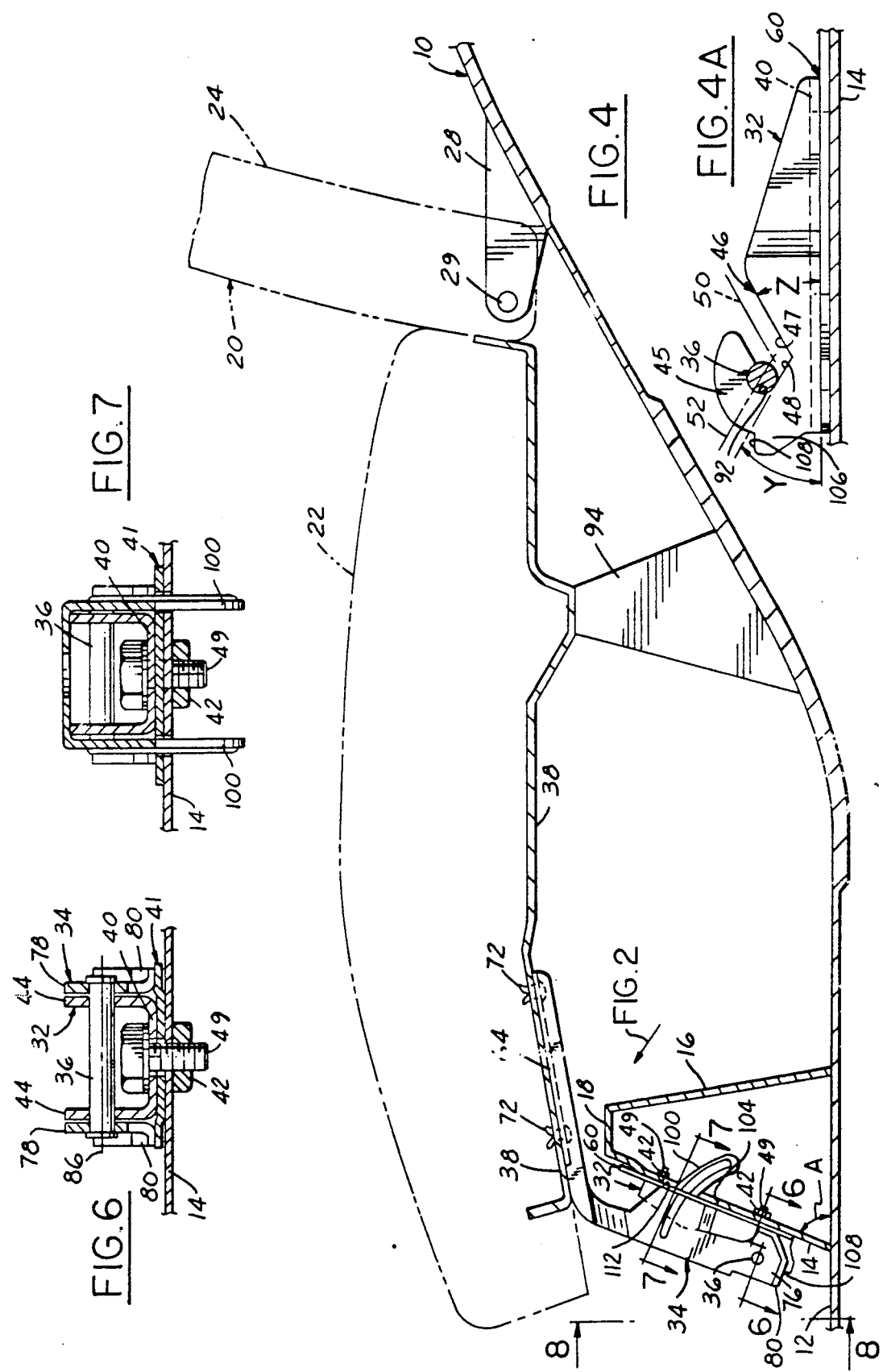

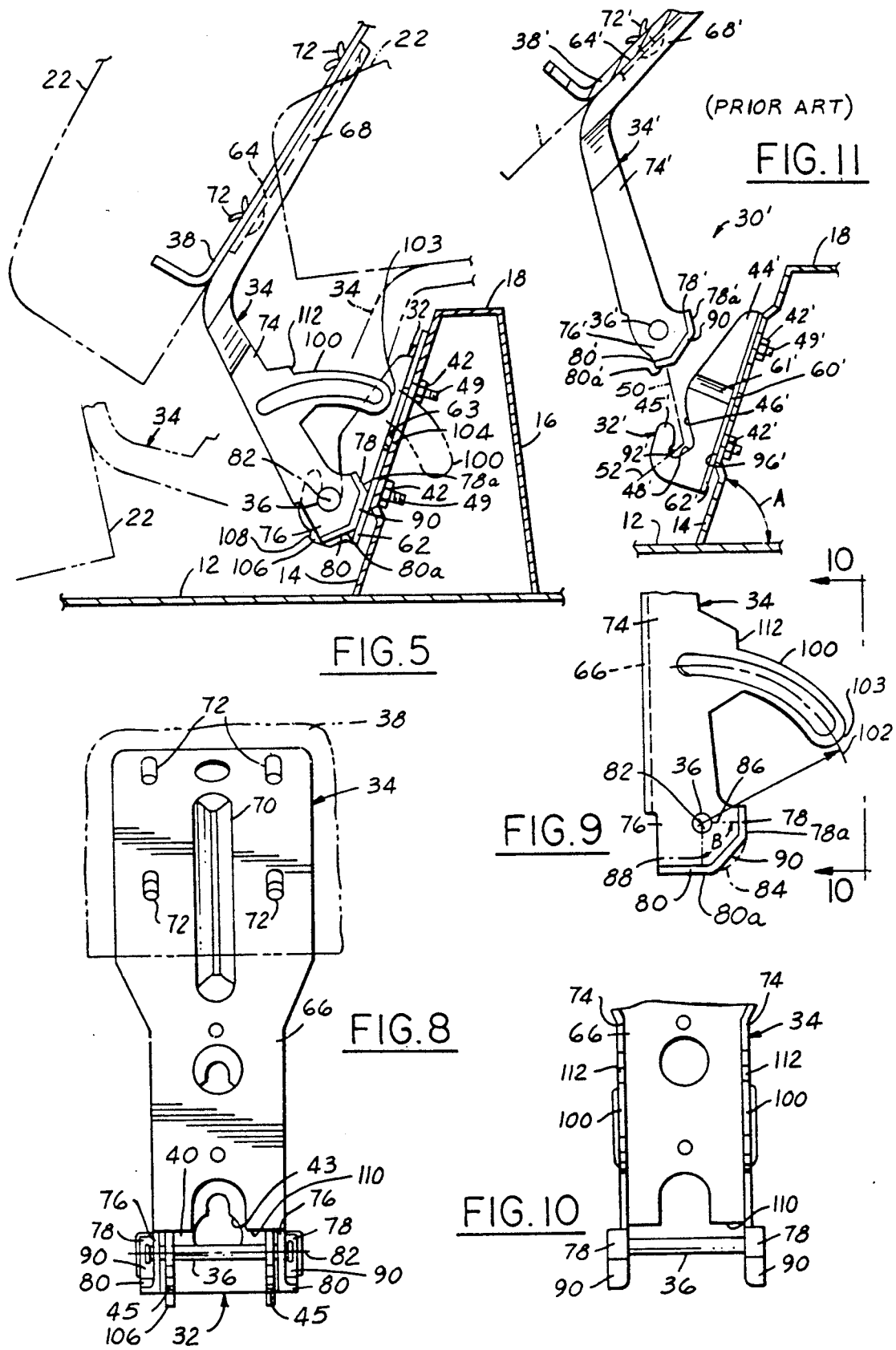

FOLDING SEAT HINGE ASSEMBLY

BACKGROUND OF THE INVENTION

This invention relates to a separable hinge assembly for automotive vehicle folding seats and more particularly to an improved separable hinge assembly for a removable folding seat cushion incorporating a fail-safe installation feature.

The U.S. Pat. No. 4,888,854 issued Dec. 26, 1989 to Russell et al., assigned to the assignee of the present application, entitled a Folding Seat Hinge Assembly With Quick Disconnect enables a folding seat cushion to be readily removed and reinstalled in a vehicle.

The separable seat hinge assembly disclosed in the Russell, et al. '854 patent comprises a body mounting or body-half hinge plate and a seat cushion mounting or seat-half hinge plate. The body mounting plate is formed with a channel-shaped cross-section having a base portion fixed to a rearwardly sloped footwall section of the vehicle floor pan. Side webs extend from the body-half plate base portion and have mirror image generally V-shaped slots with each slot including an angled open-end slot portion and an angled blind-end slot portion.

The patented Russell, et al. dog-leg shaped seat-half hinge plate, generally indicated at 30' in prior art FIG. 4A of the drawings, includes a planar tongue portion 64' and a cantilevered neck portion 66'. The tongue portion 64' is formed with crimped sides 68' and rivets 72' secure the tongue portion to the seat cushion 22' undersurface hardened back 38'. The neck portion 66' is formed with a U-shaped cross-section defining a bight section having parallel side flanges 74'. The side flanges 74' terminate at their lower free ends in a pair of parallel ears 76' fixedly supporting a transverse pintle pin 36 therebetween. Formed on the ears 76' are mirror image outboard directed dual locking cam sectors 78' and 80'. Each cam sector is disposed in an imaginary arc of a circle, having its center on the pintle pin axis, and comprises an intermediate chordal portion 90' terminating at its free ends in first and second sets of tangent cam shoulders 78a' and 80a' defining a substantially ninety degree central angle of the arc. A forward wing portion 96 projects laterally from each side of the body-half plate 32' providing a planer camming surface adapted for engagement by its associated seat-half first and second cam shoulders.

As shown and described in the '854 Russell patent with the seat cushion located in its normal mode each seat-half plate pintle pin 36' is captured in the blind-end slot portions of its associated body-half plate such that the first set of cam shoulders are in flush frictional engagement with their associated wing camming surface. Upon the seat cushion being rotated forward about the pintle pins to its overcenter folded mode each first set of cam shoulders are unlocked and each second pair of cam shoulders are pivoted into flush frictional engagement with their associated wing camming surface.

To remove the seat cushion it is only necessary to pull a side loop on the cushion to release a locking latch and pivot the seat cushion forward from its normal in-use seating mode to an intermediate upright release position adapted for lift-off removal. After swinging the seat cushion to its intermediate release position about the pintle pins each hinge assembly seat-half plate first and second sets of cam shoulders are located in spaced relation to their associated body-half plate camming surfaces. The operator then urges the upright seat cushion rearwardly causing the pintle pins to be moved out of their blind-end slot portions into their upwardly directed open-end slot portions. The operator next lifts the upright seat cushion vertically, freeing the seat-half hinge plates from their associated body-half hinge plates, and enabling ready removal of the seat cushion from the vehicle.

SUMMARY OF THE INVENTION

It is a feature of the present invention to provide an improved separable hinge assembly for removably mounting a pivotally foldable seat cushion on the floor of a passenger vehicle, which assembly, in its seat cushion upright installing position, includes fail-safe means preventing the seat cushion from being pivoted to its regular seating position unless the body-half plate and the seat-half plate of the hinge assembly are in positive full engagement.

It is another feature of the present invention to provide an improved separable hinge assembly as set forth above wherein the fail-safe means comprise arcuate-shaped guide prongs on the seat-half hinge plate adapted to be slidably received in the body-half hinge plate upon the plates being connected in positive full engagement. If the hinge plates are not in positive full engagement, i.e. are misaligned, the guide prongs will be forced into rocking contact with the body-half hinge plate. Thus, upon the installer attempting to fold the seat cushion to its regular seating position, the guide prongs are adapted to rock the seat cushion hinge-plate away from its body-half hinge plate thereby preventing the seat cushion from attaining its regular seating position.

The seat-half plate side flanges are integrally formed with a pair of mirror image arcuate shaped guide prongs. Each guide prong has its center of curvature on the pintle pin pivotal axis of the hinge plates and subtends an arc of a circle so as to be movable about the axis conjointly with the seat-half plate. Upon the seat cushion being pivoted on the pintle pins about the hinge axis to an intermediate upright hinge separable condition, the pair of guide prongs are clear of their associated body-half plate apertures. As a result, the pintle pins are free to exit their seat-half plate slots enabling the seat cushion to be lifted upwardly and removed from the vehicle.

BRIEF DESCRIPTION OF THE DRAWING

Other objects, features, and advantages of the present invention will become apparent to those skilled in the vehicle seating art are readily apparent from the following detailed description of the best mode taken in conjunction with the accompanying drawings in which:

FIG. 1 is a fragmentary perspective view, with parts cut away, of a vehicle having a rear seat including a forwardly foldable seat cushion secured by a pair of improved separable hinge assemblies according to this invention;

FIG. 2 is a fragmentary perspective view, with parts broken away, taken in the direction of the "FIG. 2" arrow in FIG. 4 showing one of the separable hinge assemblies;

FIG. 3 is an enlarged, exploded, perspective view of a separable hinge assembly;

FIG. 3A is an enlarged detail top elevational view of the body-half plate of the separable hinge assembly;

FIG. 4 is an enlarged fragmentary side elevational view, partly in section, of the seat cushion in its normal seating mode showing one separable hinge assembly:

FIG. 4A is an enlarged side elevational detail view of a prior art body-half hinge plate together with its pintle pin;

FIG. 5 is a view similar to FIG. 4 with a seat cushion separable hinge assembly pivoted from its dashedline normal mode to an intermediate disconnect position;

FIG. 5A is en enlarged, fragmentary side elevational view, partly in section, of the seat cushion in its forward, over-center stored condition.

FIG. 6 is a fragmentary cross sectional view taken on line 6—6 of FIG. 4;

FIG. 7 is a fragmentary cross sectional view taken on the line 7—7 of FIG. 4;

FIG. 8 is an enlarged detail front elevational view of a hinge assembly in its normal position;

FIG. 9 is a fragmentary detail side elevational view of the seat-half hinge plate; and FIG. 10 is a fragmentary front elevational view taken on the line 10—10 of FIG. 9; and FIG. 11 is a view of a prior art seat cushion and the hinge assembly subsequent to being rotated to a predetermined intermediate disconnect position showing the seat cushion and one seat-half hinge plate separated from its associated body-half hinge plate.

DETAILED DESCRIPTION OF THE INVENTION

Referring now to FIGS. 1 and 4 of the drawing, a vehicle 10 of the multipurpose type includes a floor pan 12 which has a rear transverse kickup tunnel defined by rearwardly and forwardly sloped or angled footwalls 14 and 16, respectively, and an intermediate horizontal wall 18. A vehicle rear seat structure 20 includes a seat cushion 22 and a seat back 24 of conventional structure. To expand the cargo area the seat cushion 22 is first pivoted forwardly about separable hinge assemblies to be described. The seat back 24 is next pivoted at its lower edge on the seat support portion 26 by suitable brackets 28 upon release of body locks (not shown) at either side of the seat back. The seat back 24 is then swung about transversely aligned pivot pins 36 between its upright position shown in FIG. 4 and a flat position shown in FIG. 1 in which its normally rearwardly facing hardened back provides an extension of the cargo floor.

FIG. 1 shows a pair of leftside and rightside improved separable hinge assemblies 30, each comprising a body mounting or body-half hinge plate 32 and a seat cushion mounting or seat-half hinge plate 34, pivotally mount the forward section of the seat cushion 22 to the vehicle floor pan 12. The seat cushion 22 is thus movable about the hinge pintle pins 36 from its solid line horizontal seating position or normal mode to its dashed line forwardly pivoted overcenter storage position or folded mode. It will be noted that the seat cushion normally downwardly facing hardened underpanel 38 provides a cargo barrier in its rearwardly facing folded position.

With reference to FIGS. 2 and 3 it will be seen that the pair of hinge assemblies 30 are identical, i.e. non-sided, and thus only the leftside hinge will be described in detail. The body-half plate 32 is formed with a channel-shaped cross section having a planar base portion 40. A coextensive sub-plate 60 is suitably fixed, as by welds, to the base portion undersurface. The subplate 60 is fastened to the rearwardly sloped footwall portion 14 of the vehicle floor pan 12 by suitable fasteners such as bolts 42. The base portion 40 has a pair of key-hole shaped apertures 43 therein adapted to adjustably receive the pre-assembled bolts 42. It will be noted that the seat cushion 22 could be a "split-type" wherein individual sections of the rear seat cushion may be folded separately to a stored mode. In such an arrangement, of course, duplicate pairs of hinge assemblies 30 would be required for each folding seat cushion section.

In FIG. 3 it will be seen that the body-half hinge plate base portion 40 has a pair of ninety degree extending side webs 44 formed with inwardly angled or crimped symmetrical web offsets 61. The side webs 44, which are generally triangular-shaped in side elevation, terminate in hook shaped portions 45 having a configuration so as to provide a pintle pin follower slot means 46 in the form of mirror image generally V-shaped through slots. As best seen in FIG. 4A each V-shaped slot means 46 is defined by an upwardly angled open-end first slot portion 47 and upwardly angled second blind-end slot portion 48. FIG. 11 of the preferred embodiment of the invention shows the body-half plate 32 disposed on the footwall 14 sloped rearwardly at an angle "A" of about 70 degrees from the horizontal floor pan 14.

It will be seen in FIG. 4A that the open-end slot portion 47 is oriented at an acute angle "Z" of the order of 30 degrees from the base portion 40. Thus, in its mounted position of FIG. 11 the entrance path of the open-end slot portion 47, as shown by dashed centerline 50, is at a combined obtuse angle of about 110 degrees from the horizontal floor pan 12. Further, the blind-end slot portion centerline 52 defines an obtuse included angle of about 120 degrees with the open-end slot portion centerline 50. Consequently the centerline 52 is sloped downwardly and forwardly at an acute angle "Y" of about 30 degrees to the horizontal floor pan 12. As best seen in FIGS. 3 and 3A the body-half hinge plate 32 coextensive sub-plate 60 is secured, as by spot welds, to the undersurface of the base portion 40. The sub-plate 60 of the improved body-half hinge plate is generally rectangular providing mirror image forward wing portions 62 that project from either side of the body-half plate at its lower or leading end adjacent the V-shaped slot means 46. The upper planar surfaces of the wing portions 62 provide camming areas to be explained. The new sub-plate 60 also provides mirror image aft wing portions 61 each formed with a rectangular elongated aperture 63 extending longitudinally adjacent its associated side web 44. The purpose of the apertures 63 will be explained below.

With reference to FIGS. 2, 3, and 10 the dog-leg shaped seat-half mounting hinge plate 34 is in the form of a planar tongue portion 64 and a narrow neck portion 66. The tongue portion 64 has crimped upright side portions 68 and a central longitudinal rib 70 to add stiffness thereto. Suitable mounting means, such as rivets 72 shown in FIG. 4, secure the tongue portion 64 to a front end section of the seat cushion hardened back 38. The neck portion 66 extends downwardly and forwardly from the tongue portion 64 defining an obtuse angle therebetween of about 120 degrees.

The seat-half neck portion is formed with a U-shaped cross section having parallel side flanges 74—74 terminating at their free ends in a pair of laterally spaced parallel ears 76—76. As seen in FIGS. 8 and 9 the ears 76—76 support the transverse pintle pin 36 therebetween. The ears 76—76 are formed with paired first 78—78 and second 80—80 sets of mirror image cam shoulders. FIG. 8 shows the body-half hinge plate 32 and the seathalf hinge plate 34 in their normal mode with the paired first and second sets of cam shoulders 78-78 and 80-80 respectively, extending in opposite directions parallel to the pintle pin axis 82.

With reference to FIG. 9 it will be seen that each first and second set of cam shoulders 78—78 and 80—80 are disposed tangentially to an imaginary arc 84 of a circle having its center on the pintle pin axis 82. It will be noted that the first 78—78 and second 80—80 tangent cam shoulders have normal radii 86 and 88 respectively, defining a central angle "B" of the order of ninety degrees. In the preferred form of the invention the first 78—78 and second 80—80 sets of cam shoulders are formed integral with an intermediate shoulder portion 90 aligned substantially on a chord of the imaginary arc 84.

In operation the seat cushion 22 is installed, as viewed in FIG. 11, by aligning each pintle pin 36 such that it is received in the upper open end of slot portion 47 for subsequent gravity induced movement into blind-end slot portion 48. As seen in FIG. 4A the slot portion 48 has its blind-end defined by a half-circle 92. The centers of each half-circle 92 establish the hinge axis 82 of the foldable seat cushion 22. Thus, the paired halfcircles 92 of each body-half plate, upon receiving their associated pintle pin 36, locate the pintle pin principal axis on center with the hinge axis 82.

With the seat cushion 22 in its FIG. 4 in use or regular seating condition, it will be seen that each first cam shoulder 78 has its cam face 78a (FIG. 5) in flush frictional engagement with an opposed camming surface 96 of its associated forward wing portion 62. Upon the seat cushion 22 being folded forward to its over-center stored condition of FIG. 5A the cam shoulders 78—78 are released and each came face 80a of the cam shoulders 80—80 is positioned in flush frictional engagement with an associated opposed forward wing portion camming surface 96. It will thus be noted that each separable hinge assembly 30 has its body-half plate and its seat-half plate held in a positive noise free manner in either its seat cushion regular seating condition or its stored condition.

Turning now to the improved arrangement of the present invention it will be seen in FIGS. 2 and that the seat-half hinge plate side flanges 74 are integrally formed with a pair of mirror image arcuate shaped guide prongs 100. FIG. 9 shows each guide prong 100 having its center of curvature located on the pintle pin axis 82 and subtending a predetermined arc of a circle 102. By this arrangement FIG. 5 shows each guide prong 100 is movable in a predetermined arc of a circle about the pin axis 82 conjointly with the seat-half hinge plate 34 with the pin 36 fully seated in the radiused ends 92 of its associated pair of blind-end slot portions 48. Upon the seat cushion 22 being pivoted rearwardly to its regular seating position, shown in phantom lines, each guide prong free end 103 extends through its associated opening 63 and aligned opening 104 in forward footwall 14.

To remove the seat cushion 22 the operator first swings the seat cushion to a predetermined intermediate upright removable position, shown in full lines FIG. 5, wherein the first and second sets of shoulder cam faces 78'—78' and 80'—80' are in their non-engaged mode, i.e. spaced from their associated wing camming surfaces 96. It will be noted that in the FIG. 5 seat cushion removable position, the guide prongs 100 are located with their free ends 103 clear of their side web openings 63 and their foot wall openings 104. The operator next lifts upwardly and rearwardly on the seat cushion 22 causing the pintle pins 36 to slide out of their associated blind-end slot portions 48 for upward travel from the open end slot portions 47. With the hinge plates 32 and 34 separated the seat cushion 22 may be removed from the vehicle.

The installation of the seat cushion 22 is as described above wherein the seat-half hinge plates 34 are shown in FIG. 5 with each guide prong free end 103 properly aligned with its associated openings 63 and 104 upon assembly of the hinge plates 32 and 34 in positive full engagement. In the event that the hinge plates are not in full engagement, i.e. the pivot pin 36 not fully seated in the follower slot 46, the guide prongs 100 will be out of alignment with their associated web and footwall apertures 63 and 104, respectively. Thus, upon folding the seat cushion 22 rearwardly to its regular seating position, the guide prongs 100 will ride on their bodyhalf hinge plate web 60 causing the seat cushion to be rocked forwardly to a non-usable condition. As a result, the installer is visually alerted to the hinge plate's non-engaged condition enabling the installer to re-position the hinge plates in their correct fullengagement mode.

While the invention has been described with reference to a particular embodiment thereof, it will be apparent that various changes may be made therein without departing from the spirit and scope of the invention and it is intended by the appended claims to cover all such modifications as fall within the true spirit and scope of the invention.

What is claimed is:

1. A separable seat hinge assembly for supporting a removable seat cushion in a vehicle body for movement about a hinge pivot axis, said separable hinge assembly including a seat-half hinge plate secured to the seat cushion having a pair of parallel spaced ears supporting a pintle pin therebetween, a body-half hinge plate secured to the vehicle body having a pair of parallel webs, each said web provided with pintle pin follower slot means formed in mirror image relation, said pintle pin being received in each said slot means such that it is aligned on the hinge axis, said body-half hinge plate and said seat-half hinge plate ears being formed with cooperating first and second sets of releasable friction engagement means such that upon said seat cushion being pivoted on said pintle pin about said hinge axis to a seating position, said first set of friction engagement means is disposed in frictional engagement, and whereby upon said seat cushion being pivoted on said pintle pin about said hinge axis to a stored position said second set of friction engagement means is disposed in frictional engagement, the improvement wherein:

said body-half hinge plate is formed with a pair of laterally extending mirror image aft wing portions, each said aft wing portion having an elongated aperture extending longitudinally therethrough;

said seat-half hinge plate having side flanges integrally formed with a pair of mirror image arcuate-shaped guide prongs for establishing said seat-half hinge plate in releasable engagement with said body-half hinge plate, each said guide prong movable about said hinge axis conjointly with said seat-half hinge plate, such that upon said seat cushion being pivoted on said pintle pin about said hinge axis to an intermediate position with each said first and second set of friction engagement means being in spaced relationship, each said guide prong is disengaged from its associated elongated aperture enabling said seat-half hinge plate pintle pin to exit each said slot means and the seat cushion to be lifted free of its associated body-half hinge plate; and further, when with said seat cushion is in said intermediate position each said guide prong has a free end thereof in spaced predetermined alignment with its associated wing portion elongated aperture, such that said seat cushion is then adapted to be pivoted on said pintle pin about said hinge axis to said seating position by rotating each said guide prong into aligned engagement within its respective elongated aperture.

2. The separable hinge assembly as set forth in claim 1, wherein each said guide prong has its center of curvature on said hinge axis and subtends a predetermined arc of a circle.

3. A separable seat hinge assembly for supporting a removable seat cushion in a vehicle body for movement about a hinge pivot axis, said separable hinge assembly including a seat-half hinge plate secured to the seat cushion having a pair of parallel spaced ears supporting a pintle pin therebetween, a body-half hinge plate secured to the vehicle body having a pair of parallel webs, each said web provided with pintle pin follower slot means formed in mirror image relation, said pintle pin being received in each said slot means such that it is aligned on the hinge axis, said body-half hinge plate formed with a pair of laterally extending mirror image forward wing portions providing a pair of camming surfaces, said seat-half hinge plate ears formed with mirror image first and second sets of arcuately spaced cam shoulders with each said first and second set of cam shoulders extending in opposite directions parallel to the hinge axis, the improvement wherein:

said body-half hinge plate formed with a pair of laterally extending mirror image aft wing portions, each said aft wing portion having an elongated aperture extending longitudinally therethrough;

said seat-half hinge plate having side flanges each flange being integrally formed with an associated one of a pair of mirror image arcuate shaped guide prongs for establishing said seat-half hinge plate in releasable engagement with said body-half hinge plate, each said guide prong having its center of curvature on said pintle pin axis and subtending a predetermined arc of a circle so as to be movable about said axis conjointly with said seat-half hinge plate, such that upon said seat member being pivoted on said pintle pin about said hinge axis to an intermediate position with each said first and second set of cam shoulders being in spaced relationship to its associated camming surface said guide prongs disengaged from their associated elongated apertures enabling said seat-half hinge plate pintle pin to exit its slot means and the seat cushion to be lifted free of its associated body-half hinge plate; and further, when said seat member is in said intermediate position, each said guide prong has a free end thereof in spaced predetermined alignment with its associated aft wing portion elongated aperture such that said seat cushion is then adapted to be pivoted on said pintle pin about a hinge axis to said seating position by rotating each said guide prong into aligned engagement within its respective elongated aperture.

* * * * *